United States Patent Office 3,694,345
Patented Sept. 26, 1972

3,694,345
NICKEL-CONTAINING CRYSTALLINE ALUMINO-SILICATE CATALYST AND HYDROCRACKING PROCESS
Clarence W. Bittner, Orinda, Calif., assignor to Shell Oil Company, New York, N.Y.
No Drawing. Filed Dec. 29, 1969, Ser. No. 888,826
Int. Cl. C10g 13/02
U.S. Cl. 208—111                                    6 Claims

ABSTRACT OF THE DISCLOSURE

An improved hydrocracking catalyst is prepared by incorporating 15–30% w. nickel and 0.05–6% w. Group VI–B metal into a crystalline alumino-silicate zeolite base. This catalyst may be used in a hydrocracking process in the presence or absence of nitrogen compounds.

BACKGROUND OF THE INVENTION

Field of the invention

This invention relates to a hydrocarbon conversion catalyst comprising nickel-containing crystalline alumino-silicate. More particularly, it relates to a zeolite catalyst of low alkali metal content comprising a relatively high percentage of nickel and a relatively low percentage of Group VI–B hydrogenation metal components and a hydrocracking process in which the catalyst is used.

Description of prior art

Catalytic functions can be broadly described as hydrogenation and acidic. Acidic catalytic properties are especially important in cracking reactions and hydrogenation functions are important for hydroconversion reactions. In many commercially significant catalysts, however, both acidic (cracking) and hydrogenation functions are desired in combination. The concept of dual functional catalysts is well known in the art and finds particular application in refining processes such as hydrocracking, isomerization, hydrofining (which includes denitrification and desulfurization) and reforming (which includes ring opening, isomerization and cracking).

It is customary to accomplish dual catalytic functionality by supporting, or otherwise incorporating, a hydrogenation component on or in a solid refractory oxide support having acidic activity. Thus, the support acts not only as a carrier for the hydrogenation component but also as the acidic catalyst component. It is also customary to enhance the acidic properties of the support by adding a halogen component. To be effective, a catalyst composite must not only possess a high degree of the desired catalytic activity and a proper balance of catalytic functions, but must be able to retain activity and catalytic balance under processing conditions for sustained periods of time and must not be excessively sensitive to catalyst poisons.

The crystalline alumino-silicate zeolites, often referred to as molecular sieves, have proved exceptionally suitable as acidic catalysts and as appropriate catalytic supports for dual functional catalysts. Both naturally occurring and synthetically prepared zeolites have demonstrated extraordinary catalytic properties. Synthetic zeolites are favored since the crystal structure and compositional purity can be carefully controlled to achieve the desired properties.

Synthetic zeolites are almost universally prepared in an alkali metal (sodium or potassium) form by crystallizing the zeolite from an aqueous reaction mixture containing alumina (as sodium aluminate, alumina sol, etc.), silica (as sodium silicate, silica gel, or silica sol) and alkali metal oxides (such as sodium hydroxide) or alkyl ammonium hydroxide. The presence of alkali metal oxide initially helps to stabilize the zeolite structure but, as is well known, the alkali metal must be replaced at least partially to achieve appreciable catalytic activity.

A large number of synthetic crystalline zeolites have been prepared and are described in the patent and general literature. They are distinguished from each other on the basis of composition, crystal structure, and adsorption properties. The existence of a number of zeolites having similar but distinguishable properties advantageously permits selection of one or more having optimum properties for a particular use. The exchange and removal of alkali metal from the crystal structure is an effective means of tailoring these materials to a specific functionality. Typical synthetic and natural aluminosilicates known in the are are summarized in U.S. Pat. No. 3,254,034. Zeolites having a silica-alumina molar ratio between about 2 and 10 and an alkali metal content of less than 2% w. (as alkali metal oxide) are particularly suitable as hydrocarbon conversion catalysts.

Zeolites composited with a Group VIII metal, such as palladium or nickel, and/or a Group VI–B metal, such as tungsten or molybdenum, are known in the art. A hydrocracking catalyst comprising palladium and one or more of the Iron Group metals, especially nickel on a zeolite base, is described in U.S. Pat. No. 3,450,626. A hydrocracking catalyst comprising a relatively low amount of nickel and a proportionally large amount of tungsten on a zeolite base is described in Australian Pat. No. 13,913/66.

Zeolite catalysts which contain a weak hydrogenation function, e.g., nickel only, yield hydrocracked products having good component distribution and quality, but exhibit poor activity and stability (of the same order as a catalyst having an amorphous base). The activity and stability can be increased by incorporating a strong hydrogenation function, e.g., palladium or nickel having a relatively high percentage of tungsten, into the zeolite base, but the hydrocracked products have a poor component distribution and quality. When the process temperature is increased to offset a decline in catalyst activity, the component distribution becomes even poorer with catalysts having a strong hydrogenation function, while the iso/normal $C_5$ and $C_6$ paraffin ratios are low over the entire processing temperature range.

SUMMARY OF THE INVENTION

It has now been discovered that an alumino-silicate zeolite having a silica-alumina molar ratio between about 2 and 10 and an alkali metal content of less than 2% w. (expressed as alkali metal oxide) when composited with 15–30% w. nickel hydrogenation component and 0.05–6% w. Group VI–B metal hydrogenation component results in a dual-function catalyst which is not only highly active but also is highly stable and selective in hydrocracking. Moreover, this catalyst provides very good results in the presence or absence of nitrogen compounds.

The catalyst of the invention combines the advantages of both weak and strong hydrogenation function catalysts while eliminating their shortcomings.

DETAILED DESCRIPTION

The catalysts of this invention are composed essentially of a crystalline alumino-silicate having a silica-alumina molar ratio of about 2 to 10, preferably a Y-zeolite, and a low alkali metal content composited with 15–30% w. nickel, preferably 19–22% w., and about .05–6% w. Group VI–B metal, preferably 0.2–4% w. The active metals can be present in the form of metals, the oxides or the sulfides. The sulfide form is particularly preferred for hydrocracking. These catalysts retain their activity and stability in the presence of nitrogen compounds which may be present in the feed to be hydrocracked up to about 5000 p.p.m.w. as nitrogen. They are also excellent for feeds which have been hydrofined to a nitrogen content below 10 p.p.m.w. before hydrocracking.

Crystalline alumino-silicates suitable for the invention include both natural and synthetic crystalline zeolites. The natural zeolites include, for example, faujasite and mordenite. The synthetic zeolites include, for example, those of the X, Y and L crystal types. These materials have a silica-alumina ratio between about 2 and 10. Zeolite Y is structurally related to the mineral faujasite as evidenced by X-ray diffraction. While faujasite has a specific silica-alumina molar ratio of about 4.6, synthetic zeolite Y products may be prepared with molar ratios varying between 3 and 6. Synthetic zeolite L has a specific silica-alumina molar ratio of about 6.4. The most suitable and preferred alumino-silicates are zeolites of the Y-class, the preparation of which is well known and described in U.S. Pat. No. 3,130,007.

Halogen promoters are not required to achieve the advantages of this invention. However, halogens can be incorporated, if desired, to increase catalyst acidity. Fluorine is the preferred halogen and can be added, e.g., as hydrogen fluoride, ammonium fluoride, ammonium bifluoride, or as a fluoride of the hydrogenation metal, in amounts up to 10% w. of the total catalyst. Generally, lower amounts in the range of 2 to 6% w. are desired. Fluoride, if desired, can be incorporated either separately from or simultaneously with the hydrogenation component.

Synthetic faujasites as customarily prepared typically contain in the range of about 5–13% w. sodium. Exchange of the sodium with hydrogen ion has long been recognized as a means of markedly improving catalytic activity. The alumino-silicate zeolites used in the present invention must have an alkali metal content, expressed as alkalimetal oxide, below about 2% w., preferably less than 1% w. This can be accomplished by ion-exchanging the monovalent metals originally present in either the synthetic or natural zeolitic base with monovalent ions such as silver, and polyvalent ions such as aluminum, calcium, magnesium, zinc or rare earth metals, or with an ammonium salt followed by calcining to convert the ammonium form to the hydrogen form. The aluminum and hydrogen forms of zeolite are particularly suitable.

The hydrogenation metal components can be composited with the zeolitic carrier by any of the techniques known to the art such as ion-exchange and/or impregnation. The metals can be incorporated into the zeolite either separately or simultaneously. However, when using an ion-exchange technique the nickel component must be incorporated prior to or simultaneously with incorporation of the Group VI–B metal component to achieve the Group VI–B metal content desired. A method for incorporating catalytically active metal, such as nickel, in excess of the amount conventionally ion-exchanged by controlling the pH of the exchange solution is described in U.S. Pat. No. 3,405,055. While tungsten can be incorporated first by impregnation followed by incorporation of nickel by ion exchange, the simultaneous incorporation of metals is preferred.

After both hydrogenation components have been incorporated into the zeolitic material the composite is dried and calcined. Suitable drying temperatures are between 100 and 200° C. The final calcination is carried out at a temperature of 400 to 650° C. in an oxygen-containing environment such as air. Suitable calcination times are from about 30 minutes to 6 hours, although longer times can be used if desired.

The catalysts are preferably used in the form of discrete particles such as granules, extrudates, pellets and the like, usually ranging in size from about 1/16-inch to about 1/4-inch in average diameter. These pellets are preferably disposed in a stationary bed within a suitable reactor capable of withstanding high pressure. Of course, smaller particles may be used in fluidized or slurry reactor systems.

Suitable feedstocks for hydrocracking processes employing these catalysts include any hydrocarbon boiling above the boiling range of the desired products. For gasoline production, hydrocarbon distillates boiling in the range of about 200 to 510° C. are preferred. Such distillates may have been obtained either from distillation of crude oils, coal tars, etc., or from other processes generally applied in the oil industry, such as thermal, catalytic or hydrogenative cracking, visbreaking, deasphalting, deasphaltenizing or combinations thereof. Since these catalysts are active and stable in the presence of nitrogen and sulfur compounds, hydrofining the feedstock is optional.

The catalysts of the invention can be used in either single or multistage hydrocracking processes. Operating conditions appropriate for a hydrocracking process using the present catalyst include temperatures in the range of about 260° C. to about 450° C., hydrogen partial pressures of about 500 to about 2000 p.s.i., liquid hourly space velocities (LHSV) of about 0.2 to about 10, preferably 0.5 to 5, and hydrogen/oil ratios of about 5 to 50.

Feed is introduced into the reaction zone as a liquid, vapor or mixed liquid-vapor phase depending upon the temperature, pressure and amount of hydrogen mixed with the feed and the boiling range of the feedstock utilized. The hydrocarbon feed, including fresh as well as recycled feed, is usually introduced into the reaction zone with a large excess of hydrogen since the hydrocracking is accompanied by a rather high consumption of hydrogen, usually of the order of 500 to 2000 standard cubic feet of hydrogen per barrel of feed. Excess hydrogen is generally recovered at least in part from the reaction zone effluent and recycled to the reactor together with additional make-up hydrogen. Pure hydrogen is not necessary since any suitable hydrogen-containing gas which is predominantly hydrogen can be used, e.g., hydrogen-rich gas containing on the order of 70% or more hydrogen which is obtained from a catalytic reforming process can be used. The hydrogen-rich gas may optionally contain nitrogen contaminants from a prior feed pretreating process thus reducing processing costs.

The catalysts prepared in accordance with the invention are easy to regenerate. Although they are outstanding because of their particularly long life, regeneration may be necessary or desirable from time to time as the catalyst becomes deactivated. The rate of catalyst deactivation will depend on the type of feedstock and upon the process conditions. A loss in catalyst activity is generaly attributed to several factors that occur within the reaction zone. One of these is the physical masking of the catalytic sites within and on the catalyst by carbonaceous deposits. Another factor is the deposit and build-up of nitrogen compounds which, being basic in nature, neutralize the acidic sites of the catalyst. Catalyst activity can be partially or completely restored by removing these deposits with a controlled oxidation in the presence of dilute air, or gases low in oxygen content, to avoid excess heat release and overheating the catalyst. It is generally sufficient to apply temperatures up to 525° C. to effect reactivation. The catalyst temperature should not exceed 800° C. The catalyst is generally sulfided with sulfur containing gases or liquids before being reused in the hydrocracking process.

The following examples will illustrate the invention and its advantages.

EXAMPLE I

To demonstrate the improvement in catalyst activity and stability and the improvement in product quality, two catalysts of the invention were prepared and tested in a hydrocracking process. Catalysts containing weak and strong hydrogenation functions were also prepared and tested for comparison.

Catalyst A, having a weak hydrogenation function, was prepared from a powdered sodium Y-faujasite, having a $SiO_2/Al_2O_3$ mole ratio of about 4.7, and a sodium content of 8.6% w. This material was contacted with boiling 0.5 M aluminum nitrate by 15-ten minute exchanges, thereby converting it to an aluminum Y-faujasite (Al-Y). After drying at 120° C. for 16 hours the Al-Y was contacted with boiling 0.5 M nickel acetate and 0.5 M ammonium fluoride by 4-one hour exchanges. Freshly prepared solutions were used for exchange in all catalyst preparations.

Catalyst B, having a hydrogenation function better balanced with respect to the acid function, was prepared by contacting an Al-Y faujasite, prepared as for Catalyst A, with a boiling solution of 1.0 M nickel acetate and 0.001 M ammonium metatungstate by 4 one-hour exchanges.

Catalyst C, having a hydrogenation function containing more tungsten and also balanced with respect to the acid function, was prepared by contacting an Al-Y faujasite prepared as for Catalyst A with a boiling solution of 1.0 M nickel acetate and 0.004 M ammonium metatungstate by 4 one-hour exchanges.

Catalyst D, having a strong hydrogenation function, was prepared by contacting an Al-Y faujasite, prepared as for Catalyst A, with a boiling solution of 0.5 M nickel acetate, 0.02 M ammonium metatungstate, and 0.1 M ammonium fluoride by 4-one hour exchanges.

Following ion-exchange the four catalysts were dried at 120° C. for 16 hours, pelleted, and calcined at 550° C. for 2 hours. All catalysts had less than 1% w. sodium oxide content after the treatment. Each of the catalysts was sulfided by passing 10% v. $H_2S$ in hydrogen over the catalyst for 7 hours at temperatures programmed from 200 to 540° C. These were then used to hydrocrack previously hydrotreated catalytically cracked gas oil containing 36% v. aromatics, 2400 p.p.m. sulfur, and 4.2 p.p.m. nitrogen and having a gravity of 30.0° API and a boiling range of 150 to 380° C. The hydrocracking conditions were: pressure, 1500 p.s.i.g.; LHSV, 2.0; hydrogen/oil ratio, 10 mols hydrogen/mol of feed; and temperature adjusted as necessary to give about 67% conversion per pass to hydrocarbons boiling less than 196° C. The results were as follows:

TABLE 1

| | Catalyst | | | |
|---|---|---|---|---|
| | A | B | C | D |
| Composition, percent weight: | | | | |
| Ni | 22 | 22 | 22 | 17 |
| W | | 0.24 | 2 | 9 |
| F | 6 | | | 2 |
| Temperature, °C., at 14 days [a] | 383 | 360 | 349 | 349 |
| Decline rate, °C./day [b] | 1.85 | 0.45 | 0.35 | 0.35 |
| Product inspection: | | | | |
| Temperature, °C | 386 | 365 | 358 | 342 |
| Time, days | 15 | 25 | 44 | 10 |
| Selectivity, percent weight (C$_7$–196° C.) | 65 | 65 | 65 | 65 |
| Iso/normal paraffin ratio: | | | | |
| C$_4$ | 1.7 | 1.6 | 1.6 | 2.0 |
| C$_5$ | 10.0 | 11.0 | 9.5 | 5.5 |
| C$_6$ | 16.0 | 19.0 | 18.0 | 9.0 |
| Composition, percent volume (C$_7$–196° C.): | | | | |
| Paraffins | 37 | 32 | 30 | 35 |
| Naphthenes | 45 | 47 | 49 | 52 |
| Aromatics | 18 | 21 | 21 | 13 |

[a] Stable operation reached after break-in period.
[b] From 14 days to end-of-run.

Catalyst activity is indicated by the temperature required to achieve a given conversion after 14 days operation. A lower temperature requirement indicates a more active catalyst.

Catalyst stability is indicated by the rate of temperature decline at constant conversion, i.e., the greater the decline rate, the less stable the catalyst.

Catalyst selectivity is indicated by the high operating temperature which can be employed while obtaining a high yield of C$_7$–196° C. naphtha.

Product quality is indicated by the iso/normal C$_5$ and C$_6$ paraffin ratios and by the percent aromatics in the C$_7$–196° C. fraction. High iso/normal ratios and a high aromatics content are most desirable in the product.

The product inspections were made at a constant selectivity of 65% w., basis feed, to C$_7$–196° C. boiling range product. Thus, the time at which this selectivity was reached differs for each catalyst and an advantage is usable life exists for the catalysts reaching this point at a later time. The catalyst performance could also have been compared at the same time, but then selectivity to C$_7$–196° C. boiling range would have been different for each catalyst. However, the conclusion remains the same regardless of the comparison used, i.e., that catalysts of the invention are significantly better than catalysts having only weak or strong hydrogenation functions.

From the above data, it can be seen that while Catalyst A, which has a relatively weak hydrogenation function, has excellent selectivity and provides excellent product quality, it has the poorest activity and stability of the four catalysts tested. Catalyst D, which has a rather large amount of tungsten and thus a relatively strong hydrogenation function, has improved activity and stability compared with Catalyst A, but at a considerable loss in selectivity and product quality. On the other hand, Catalysts B and C having a small amount of tungsten in accordance with the invention, have not only a better activity and stability than Catalyst A, but a better selectivity and product quality as well.

Thus, an excellent hydrocracking catalyst is obtained from crystalline alumino-silicates by a proper combination of hydrogenative metals to provide a balanced hydrogenation function. This can be accomplished without adding fluoride to the catalyst to increase the acidic or cracking function. Lack of fluorine in a catalyst is desirable in reducing equipment corrosion.

EXAMPLE II

This example demonstrates that the catalysts of the invention have superior activity and stability and yield products of excellent selectivity and quality in a hydrocracking process without removing the gaseous conversion products from a prehydrogenation of the feed.

Catalyst E was prepared by exchanging 50 grams of Davison Ultra-Stable Y-zeolite (McDaniel, C. V. and P. K. Maher, "New Ultra-Stable Form of Faujasite" in "Molecular Sieves" (R. M. Barrer, ed.), p. 186, Soc. Chem. Ind., London, 1968) three times with 200 cc. of boiling 1.0 M ammonium nitrate for one hour each, filtering and washing with water after each exchange, drying at 120° C. for 16 hours and calcining at 550° C. for 2 hours. The calcined catalyst had a sodium oxide content of 0.4% w. This zeolite, now in the hydrogen form (H-Y), was then exchanged four times with 127 cc. of a boiling solution of 1.0 M nickel acetate and 0.004 M ammonium metatungstate, washed with boiling water after each exchange, dried at 120° C. for 16 hours, pelleted and calcined at 550° C. for 2 hours.

For comparison a catalyst outside the invention having a high-nickel and high-tungsten (strong-hydrogenation function) on a fluorided H-Y zeolite base (Catalyst F) was prepared similar to Catalyst E, except that a 0.02 M ammonium metatungstate solution was used to increase the tungsten concentration and the solution was 0.1 M with respect to ammonium fluoride.

The feedstock to the hydrocracking process was a 50/50 mixture of straight run and catalytically cracked gas oils (21.8% API, 231 mol. wt., 61% v. aromatics and 251-375° C. boiling range) containing 1400 p.p.m. N, 6500 p.p.m. S, and 2300 p.p.m. O which was first hydrofined over an alumina catalyst comprising 3% w. Ni, 11% w. Mo and 6% w. F. The entire product, having an organic nitrogen content of 3 p.p.m., was passed over Catalysts E and F without removal of $NH_3$, $H_2S$ or $H_2O$. This material was hydrocracked at a pressure of 1500 p.s.i.g., a hydrogen/oil molar ratio of 12, and an LHSV of 1.5 with the process temperature being varied to yield about 67% conversion to hydrocarbon boiling less than 196° C. The results were as follows:

TABLE 2

| | Catalyst | |
|---|---|---|
| | E | F |
| Composition, percent weight: | | |
| Ni | 19.4 | 15 |
| W | 1.4 | 9 |
| F | | 2 |
| Temperature, ° C., at 14 days [a] | 387 | 381 |
| Decline rate, ° C./day [b] | 0.1 | 0.1 |
| Product inspection: | | |
| Temperature, ° C | 387 | 391 [c] |
| Time, days | 21 | 19 |
| Percent weight conversion (<196° C.) | 68 | 67 |
| Selectivity, percent weight (basis feed): | | |
| $C_1-C_4$ | 11.7 | 11.9 |
| $C_5-C_6$ | 19.7 | 23.6 |
| $C_7$-196° C | 67.6 | 64.5 |
| Iso/normal paraffin ratio: | | |
| $C_4$ | 1.8 | 1.6 |
| $C_5$ | 8.8 | 3.8 |
| $C_6$ | 11.4 | 6.8 |
| Composition, percent volume ($C_7$-196° C.): | | |
| Paraffins | 21.3 | 24.5 |
| Napthenes | 51.9 | 57.0 |
| Aromatics | 26.8 | 18.5 |

[a] Stable operation reached after break-in period.
[b] From 14 days to end-of-run.
[c] At 2.2 LHSV.

Note that the low-tungsten Catalyst E is better than the high-tungsten Catalyst F in $C_7$-196° C. naphtha selectivity (67.6 vs. 64.5% w.). Also, both the iso/normal $C_5$ and $C_6$ paraffin ratios and the aromatics content of the $C_7$-196° C. naphtha (26.8 vs. 18.5% w.) are superior for Catalyst E.

EXAMPLE III

This example demonstrates the advantages of a high-nickel and low-tungsten zeolite catalyst in a single-stage hydrocracking process, i.e., hydrocracking without prehydrogenation of the feed. A palladium catalyst having the same base was used for comparison. Palladium zeolites are known to be highly active and selective hydrocracking catalysts, but cost more than the catalysts of the invention.

Catalyst G contained palladium, a strong hydrogenation function, on a Davison Ultra-Stable Y-zeolite in the hydrogen form (H-Y). Palladium was composited with the zeolite by contacting the solid for 16 hours at 25° C. with a solution of 0.7 M ammonium nitrate and 0.014 M palladium chloride adjusted to pH 7. After exchange, the solid was washed with water and dried at 120° C. for 16 hours. It was then pelleted and calcined in air for 2 hours at 200° C., 3 hours at 350° C. and 16 hours at 550° C.

Catalyst H had a high-nickel and low-tungsten hydrogenation function on a Davison Ultra-Stable H-Y zeolite base and was prepared similar to Catalyst E of Example II, except that a solution of 0.68 M nickel acetate and 0.0006 M ammonium metatungstate was used in the exchange. This catalyst was then calcined in the same manner as Catalyst E.

These catalysts were used to hydrocrack a straight-run gas oil (29.7° API, 300 mol. wt., 28% v. aromatics, 203-460° C. boiling range) containing 170 p.p.m. N, 3000 p.p.m. S, and 1900 p.p.m. O, at a pressure of 1500 p.s.i.g., LHSV of 1.5 and a hydrogen/oil molar ratio of 10. The results were as follows:

TABLE 3

| | Catalyst | |
|---|---|---|
| | G | H |
| Composition, percent weight: | | |
| Pd | 1.3 | |
| Ni | | 17.3 |
| W | | 0.4 |
| At 67 percent weight, conversion (<199° C.): | | |
| Temperature, °C. at 30 days | 390 | 379 |
| Product inspection (avg.): | | |
| Temperature, ° C | 388 | 376 |
| Conversion, percent weight (<199° C.) | 64 | 68 |
| Selectivity to $C_7$-199° C | 58 | 60 |
| Conversion, percent weight (<271° C.) | 80 | 80 |
| Selectivity, percent weight (basis product <271° C.): | | |
| $C_1-C_4$ | 15 | 11.5 |
| $C_5$-160° C | 61 | 58.5 |
| 160-271° C | 24 | 30 |
| Iso/normal paraffin ratio: | | |
| $C_4$ | 1.8 | 1.9 |
| $C_5$ | 7.5 | 13.5 |
| $C_6$ | 13.0 | 20.0 |

Catalyst H is superior in activity to Catalyst G as indicated by a lower temperature after 30 days operation (379 vs. 390° C.). Moreover, Catalyst H yields a superior product distribution and quality as shown by the higher selectivity to $C_7$-199° C. naphtha (60 vs. 58%), higher selectivity to 160-271° C. jet fuel (30 vs. 24%), lower selectivity to economically undesirable $C_1-C_4$ (11.5 vs. 15%) and higher iso/normal $C_5$ (13.5 vs. 7.5) and $C_6$ (20 vs. 13) paraffin ratios.

I claim as my invention:

1. A hydrocracking catalyst which comprises a crystalline alumino-silicate Y-zeolite base, an alkali metal content of less than 2% w., as alkali metal oxide, 15-30% w. nickel and 0.05-6% w. tungsten.

2. The catalyst composition of claim 1 wherein the alumino-silicate base is stabilized Y-zeolite, the nickel content is from 19-22% w. and the tungsten content is from 0.2-4% w.

3. A process for hydrocracking a hydrocarbon fraction having a major portion of components boiling above the boiling range of the desired products which comprises:
   contacting the fraction with hydrogen at a temperature of about 260 to 450° C., a hydrogen partial pressure of about 500 to about 2000 p.s.i.g., a hydrogen oil ratio of about 5 to 50 and an LHSV of about 0.5 to 5;
   in the presence of a catalyst comprising a crystalline alumino-silicate zeolite having a silica to alumina mole ratio of about 2 to about 10, an alkali metal content of less than 2% w., as alkali metal oxide, 15-30° w. nickel and 0.05-6% w. tungsten.

4. The process of claim 3 wherein the alumino-silicate base is Y-zeolite.

5. The process of claim 3 wherein the alumino-silicate base is stabilized Y-zeolite, the alkali metal content is less than 1% w., as metal oxide, the nickel content is from 19-22% w. and tungsten content is from 0.2-4% w.

6. The process of claim 3 wherein the hydrocarbon fraction contains less than about 5000 p.p.m.w. nitrogen.

References Cited

UNITED STATES PATENTS

| | | | |
|---|---|---|---|
| 3,392,108 | 7/1968 | Mason et al. | 208—111 |
| 3,394,074 | 7/1968 | Buchmann et al. | 208—111 |
| 3,405,055 | 10/1968 | Bittner | 208—111 |
| 3,531,396 | 9/1970 | Messing et al. | 208—111 |
| 3,547,808 | 12/1970 | Hansford | 208—111 |
| 3,549,518 | 12/1970 | Mason et al. | 208—111 |
| 3,620,964 | 11/1971 | Stover et al. | 208—111 |

FOREIGN PATENTS

| | | | |
|---|---|---|---|
| 1,451,019 | 8/1966 | France | 208—111 |
| 1,083,110 | 9/1967 | United Kingdom | 208—111 |
| 1,506,793 | 12/1967 | France | 208—111 |

DELBERT E. GANTZ, Primary Examiner

G. E. SCHMITKONS, Assistant Examiner

U.S. Cl. X.R.

252—455 Z